United States Patent
Yin et al.

(10) Patent No.: US 12,374,033 B2
(45) Date of Patent: Jul. 29, 2025

(54) RENDERING METHOD, DEVICE, AND SYSTEM

(71) Applicant: Huawei Cloud Computing Technologies Co., Ltd., Guizhou (CN)

(72) Inventors: Qing Yin, Xi'an (CN); Kun Xie, Shenzhen (CN)

(73) Assignee: Huawei Cloud Computing Technologies Co., Ltd., Guizhou (CN)

( * ) Notice: Subject to any disclaimer, the term of this patent is extended or adjusted under 35 U.S.C. 154(b) by 152 days.

(21) Appl. No.: 18/167,433

(22) Filed: Feb. 10, 2023

(65) Prior Publication Data

US 2023/0186554 A1 Jun. 15, 2023

Related U.S. Application Data

(63) Continuation of application No. PCT/CN2021/112645, filed on Aug. 14, 2021.

(30) Foreign Application Priority Data

Aug. 15, 2020 (CN) .................. 202010821657.X

(51) Int. Cl.
  *G06T 15/00* (2011.01)
  *G06T 15/50* (2011.01)

(52) U.S. Cl.
  CPC .......... *G06T 15/506* (2013.01); *G06T 15/005* (2013.01)

(58) Field of Classification Search
  CPC .......... G06T 3/40; G06T 17/20; G06T 15/04; G06T 17/00; G06T 15/50; G06T 2210/36

(Continued)

(56) References Cited

U.S. PATENT DOCUMENTS 10,810,783 B2 * 10/2020 Yin .................. G06T 17/00
11,232,633 B2 * 1/2022 Lee .................. G06T 19/20

(Continued)

FOREIGN PATENT DOCUMENTS

CN 107464208 A 12/2017

OTHER PUBLICATIONS

Chen M, Shao Z, Li D, Liu J. Invariant matching method for different viewpoint angle images. Applied optics. Jan. 1, 2013;52(1):96-104.*

(Continued)

*Primary Examiner* — Phu K Nguyen
(74) *Attorney, Agent, or Firm* — WOMBLE BOND DICKINSON (US) LLP

(57) ABSTRACT

A rendering method is provided, including the following: A rendering platform obtains an influential variable of a coloring result of a to-be-processed grid (S201), where the to-be-processed grid includes some regions of a surface of a three-dimensional model; the rendering platform selects a coloring result of a matching sample grid from a grid rendering resource based on the influential variable of the coloring result of the to-be-processed grid (S202), where the grid rendering resource stores influential variables of coloring results of a plurality of sample grids and corresponding coloring results of the plurality of sample grids; and the rendering platform returns the coloring result of the matching sample grid as the coloring result of the to-be-processed grid (S203). According to the foregoing method, a waste of computing resources can be effectively reduced.

20 Claims, 11 Drawing Sheets

(58) Field of Classification Search
USPC .......................................................... 345/418
See application file for complete search history.

(56) References Cited

U.S. PATENT DOCUMENTS

2008/0024495 A1   1/2008   Mech et al.
2015/0273328 A1   10/2015  Kruglick

OTHER PUBLICATIONS

Pulli K, Shapiro LG. Surface reconstruction and display from range and color data. Graphical Models. May 1, 2000;62(3):165-201.*
Zaharescu A, Boyer E, Varanasi K, Horaud R. Surface feature detection and description with applications to mesh matching. In2009 IEEE conference on computer vision and pattern recognition Jun. 20, 2009 (pp. 373-380). IEEE.*
Sequeira V, Ng K, Wolfart E, Gonçalves JG, Hogg D. Automated reconstruction of 3D models from real environments. ISPRS Journal of Photogrammetry and Remote Sensing. Feb. 1, 1999;54(1):1-22.*

* cited by examiner

RENDERING METHOD, DEVICE, AND SYSTEM

CROSS-REFERENCE TO RELATED APPLICATIONS

This application is a continuation of International Application No. PCT/CN2021/112645, filed on Aug. 14, 2021, which claims priority to Chinese Patent Application No. 202010821657.X, filed on Aug. 15, 2020, the disclosure of which is hereby incorporated by reference in its entirety.

TECHNICAL FIELD

This application relates to the 3D field, and in particular, to a rendering method, a device, and a system.

BACKGROUND

Rendering is a process of generating an image from a three-dimensional model by using software. The three-dimensional model is a description of a three-dimensional object by using a strictly defined language or data structure, and includes geometrical, viewpoint, texture, and illumination information. The image is a digital image or a bitmap image. The term rendering is similar to "rendering of a scene by an artist". In addition, rendering is also used to describe a "process of computing an effect in a video editing file to generate a final video output".

However, in a conventional technology, rendering requires a quite large amount of computation, and needs to consume a quite large quantity of computing resources.

SUMMARY

This application provides a rendering method, a device, and a system, to effectively reduce a waste of computing resources.

According to a first aspect, a rendering method is provided, including:
  a rendering platform obtains an influential variable of a coloring result of a to-be-processed grid, where the to-be-processed grid includes some regions of a surface of a three-dimensional model;
  the rendering platform selects a coloring result of a matching sample grid from a grid rendering resource based on the influential variable of the coloring result of the to-be-processed grid, where the grid rendering resource stores influential variables of coloring results of a plurality of sample grids and corresponding coloring results of the plurality of sample grids; and
  the rendering platform returns the coloring result of the matching sample grid as the coloring result of the to-be-processed grid.

In the foregoing solution, coloring results of a large quantity of sample grids may be prestored in the grid rendering resource, and when the to-be-processed grid needs to be colored, the coloring result of the matching sample grid may only need to be selected from the grid rendering resource based on the influential variable of the coloring result of the to-be-processed grid and returned as the coloring result of the to-be-processed grid. No complex computation needs to be performed on the grid. Because costs of a storage resource are far lower than costs of a computing resource, a large quantity of computing resources can be saved by replacing computation with storage.

In an embodiment, the influential variable of the coloring result of the to-be-processed grid includes any one or more of the following: a scene identifier, a grid identifier, a light source quantity, a light source type, a light source position, a grid normal angle, a grid material, and a grid position.

In an embodiment, the influential variable of the coloring result of the to-be-processed grid includes a scene identifier and a grid identifier; and
  that the rendering platform selects a coloring result of a matching sample grid from a grid rendering resource based on the influential variable of the coloring result of the to-be-processed grid includes:
  the rendering platform selects, from the grid rendering resource, the matching sample grid whose scene identifier and grid identifier match the scene identifier and the grid identifier of the coloring result of the to-be-processed grid.

In the foregoing solution, a search range can be effectively narrowed by using the scene identifier and the grid identifier, to quickly find the matching sample grid. It can be understood that, in many cases, a user has previously stored a sample grid of a three-dimensional model of a sample scene in the grid rendering resource, and when the user encounters the sample grid of the sample scene later, a coloring result of the sample grid of the sample scene may be found from the grid rendering resource by using a scene identifier and a grid identifier, thereby greatly narrowing a search range. For example, when the user plays a mission accomplishment game, if the user fails a mission last time, a scene and a grid that need to be rendered for the user last time are the same as a scene and a grid that need to be rendered this time, and the rendering platform only needs to use a grid coloring result obtained through last rendering, without repeatedly performing rendering again.

In an embodiment, the influential variable of the coloring result of the to-be-processed grid includes any one or more of the following: a light source type, a light source position, a grid normal angle, a grid material, and a grid position; and
  that the rendering platform selects a coloring result of a matching sample grid from a grid rendering resource based on the influential variable of the coloring result of the to-be-processed grid includes:
  the rendering platform selects, from the grid rendering resource, the matching sample grid whose light source type, light source position, grid normal angle, grid material, and grid position have a similarity, greater than a first threshold, to the light source type, the light source position, the grid normal angle, the grid material, and the grid position of the coloring result of the to-be-processed grid.

In the foregoing solution, even if a scene of the to-be-processed grid is completely different from a scene of the sample grid, provided that the light source type, the light source position, the grid normal angle, the grid material, and the grid position of the to-be-processed grid are the same as or similar to the light source type, the light source position, the grid normal angle, the grid material, and the grid position of the sample grid, the coloring result of the sample grid can be used as the coloring result of the to-be-processed grid, thereby extending a range of a sample space of the grid rendering resource. For example, a coloring result of a grid that is a grid on a lake surface in a scene about a forest may also be used as a coloring result of a grid that is a grid on spring water in a scene about a desert.

In an embodiment, the influential variable of the coloring result of the to-be-processed grid includes any one or more of the following: a scene identifier, a grid identifier, a light source quantity, a light source type, a light source position, a grid normal angle, a grid material, and a grid position; and when no sample grid matching the scene identifier and the grid identifier of the coloring result of the to-be-processed grid exists in the grid rendering resource, the rendering platform selects, from the grid rendering resource, the matching sample grid whose light source type, light source position, grid normal angle, grid material, and grid position have a similarity, greater than a first threshold, to the light source type, the light source position, the grid normal angle, the grid material, and the grid position of the coloring result of the to-be-processed grid.

In an embodiment, light sources and three-dimensional objects of two scenes with a same scene identifier are the same or have a similarity greater than a second threshold.

In an embodiment, when there is one matching sample grid, the rendering platform uses a coloring result of the matching sample grid as the coloring result of the to-be-processed grid; or when there are a plurality of matching sample grids, the rendering platform uses an average value of the matching sample grids as the coloring result of the to-be-processed grid.

According to a second aspect, a method for establishing a grid rendering resource is provided.

A rendering platform obtains an influential variable of a coloring result of a first sample grid, where the first sample grid includes some regions of a surface of a three-dimensional model;

the rendering platform determines the coloring result of the first sample grid; and the rendering platform stores, in a grid rendering resource, the influential variable of the coloring result of the first sample grid and the coloring result of the first sample grid in association.

In an embodiment, the influential variable of the coloring result of the first sample grid includes any one or more of the following: a scene identifier, a grid identifier, a light source quantity, a light source type, a light source position, a grid normal angle, a grid material, and a grid position.

In an embodiment, the influential variable of the coloring result of the first sample grid includes a scene identifier and a grid identifier; and when the scene identifier and the grid identifier of the coloring result of the first sample grid match a scene identifier and a grid identifier of a coloring result of a second sample grid, the coloring result of the second sample grid is discarded, or the coloring result of the first sample grid is updated by using an average value of the coloring result of the first sample grid and the coloring result of the second sample grid.

In an embodiment, the influential variable of the coloring result of the first sample grid includes a light source quantity, a light source type, a light source position, a grid normal angle, a grid material, and a grid position; and when the light source quantity, the light source type, the light source position, the grid normal angle, the grid material, and the grid position of the coloring result of the first sample grid have a similarity, greater than a first threshold, to a light source quantity, a light source type, a light source position, a grid normal angle, a grid material, and a grid position of the coloring result of the second sample grid, the coloring result of the second sample grid is discarded, or the coloring result of the first sample grid is updated by using an average value of the coloring result of the first sample grid and the coloring result of the second sample grid.

In an embodiment, light sources and three-dimensional objects of two scenes with a same scene identifier are the same or have a similarity greater than a second threshold.

According to a third aspect, a rendering platform is provided, including an obtaining module, a selection module, and a coloring module.

The obtaining module is configured to obtain an influential variable of a coloring result of a to-be-processed grid, where the to-be-processed grid includes some regions of a surface of a three-dimensional model.

The selection module is configured to select a coloring result of a matching sample grid from a grid rendering resource based on the influential variable of the coloring result of the to-be-processed grid, where the grid rendering resource stores influential variables of coloring results of a plurality of sample grids and corresponding coloring results of the plurality of sample grids.

The coloring module is configured to return the coloring result of the matching sample grid as the coloring result of the to-be-processed grid.

In an embodiment, the influential variable of the coloring result of the to-be-processed grid includes any one or more of the following: a scene identifier, a grid identifier, a light source quantity, a light source type, a light source position, a grid normal angle, a grid material, and a grid position.

In an embodiment, the influential variable of the coloring result of the to-be-processed grid includes a scene identifier and a grid identifier; and the selection module is configured to select, from the grid rendering resource, the matching sample grid whose scene identifier and grid identifier match the scene identifier and the grid identifier of the coloring result of the to-be-processed grid.

In an embodiment, the influential variable of the coloring result of the to-be-processed grid includes any one or more of the following: a light source type, a light source position, a grid normal angle, a grid material, and a grid position; and the selection module is configured to select, from the grid rendering resource, the matching sample grid whose light source type, light source position, grid normal angle, grid material, and grid position have a similarity, greater than a first threshold, to the light source type, the light source position, the grid normal angle, the grid material, and the grid position of the coloring result of the to-be-processed grid.

In an embodiment, light sources and three-dimensional objects of two scenes with a same scene identifier are the same or have a similarity greater than a second threshold.

In an embodiment, the coloring module is configured to: when there is one matching sample grid, use a coloring result of the matching sample grid as the coloring result of the to-be-processed grid; or the coloring module is configured to: when there are a plurality of matching sample grids, use an average value of the matching sample grids as the coloring result of the to-be-processed grid.

According to a fourth aspect, a rendering platform is provided, including an obtaining module, a determining module, and a storage module.

The obtaining module is configured to obtain an influential variable of a coloring result of a first sample grid, where the first sample grid includes some regions of a surface of a three-dimensional model.

The determining module is configured to determine the coloring result of the first sample grid.

The storage module is configured to store, in a grid rendering resource, the influential variable of the coloring result of the first sample grid and the coloring result of the first sample grid in association.

In an embodiment, the influential variable of the coloring result of the first sample grid includes any one or more of the following: a scene identifier, a grid identifier, a light source quantity, a light source type, a light source position, a grid normal angle, a grid material, and a grid position.

In an embodiment, the influential variable of the coloring result of the first sample grid includes a scene identifier and a grid identifier; and the storage module is configured to: when the scene identifier and the grid identifier of the coloring result of the first sample grid match a scene identifier and a grid identifier of a coloring result of a second sample grid, discard the coloring result of the second sample grid, or update the coloring result of the first sample grid by using an average value of the coloring result of the first sample grid and the coloring result of the second sample grid.

In an embodiment, the influential variable of the coloring result of the first sample grid includes a light source quantity, a light source type, a light source position, a grid normal angle, a grid material, and a grid position; and the storage module is configured to: when the light source quantity, the light source type, the light source position, the grid normal angle, the grid material, and the grid position of the coloring result of the first sample grid have a similarity, greater than a first threshold, to a light source quantity, a light source type, a light source position, a grid normal angle, a grid material, and a grid position of the coloring result of the second sample grid, discard the coloring result of the second sample grid, or update the coloring result of the first sample grid by using an average value of the coloring result of the first sample grid and the coloring result of the second sample grid.

In an embodiment, light sources and three-dimensional objects of two scenes with a same scene identifier are the same or have a similarity greater than a second threshold.

According to a fifth aspect, a rendering node is provided, including a memory and a processor. The processor executes a program in the memory to run a computing service and a storage service, so as to perform the method according to any one of the first aspect or the second aspect.

According to a sixth aspect, a computer-readable storage medium is provided, including instructions. When the instructions are run on a computing node, the computing node is enabled to perform the method according to any one of the first aspect or the second aspect.

According to a seventh aspect, a cloud rendering system is provided, including a terminal device, a network device, and a rendering platform. The terminal device communicates with the rendering platform by using the network device, and the rendering platform is configured to perform the method according to any one of the first aspect or the second aspect.

BRIEF DESCRIPTION OF DRAWINGS

To describe technical solutions in embodiments of this application or in the background more clearly, the following describes the accompanying drawings used in embodiments of this application or in the background.

DESCRIPTION OF EMBODIMENTS

Figure 1A:
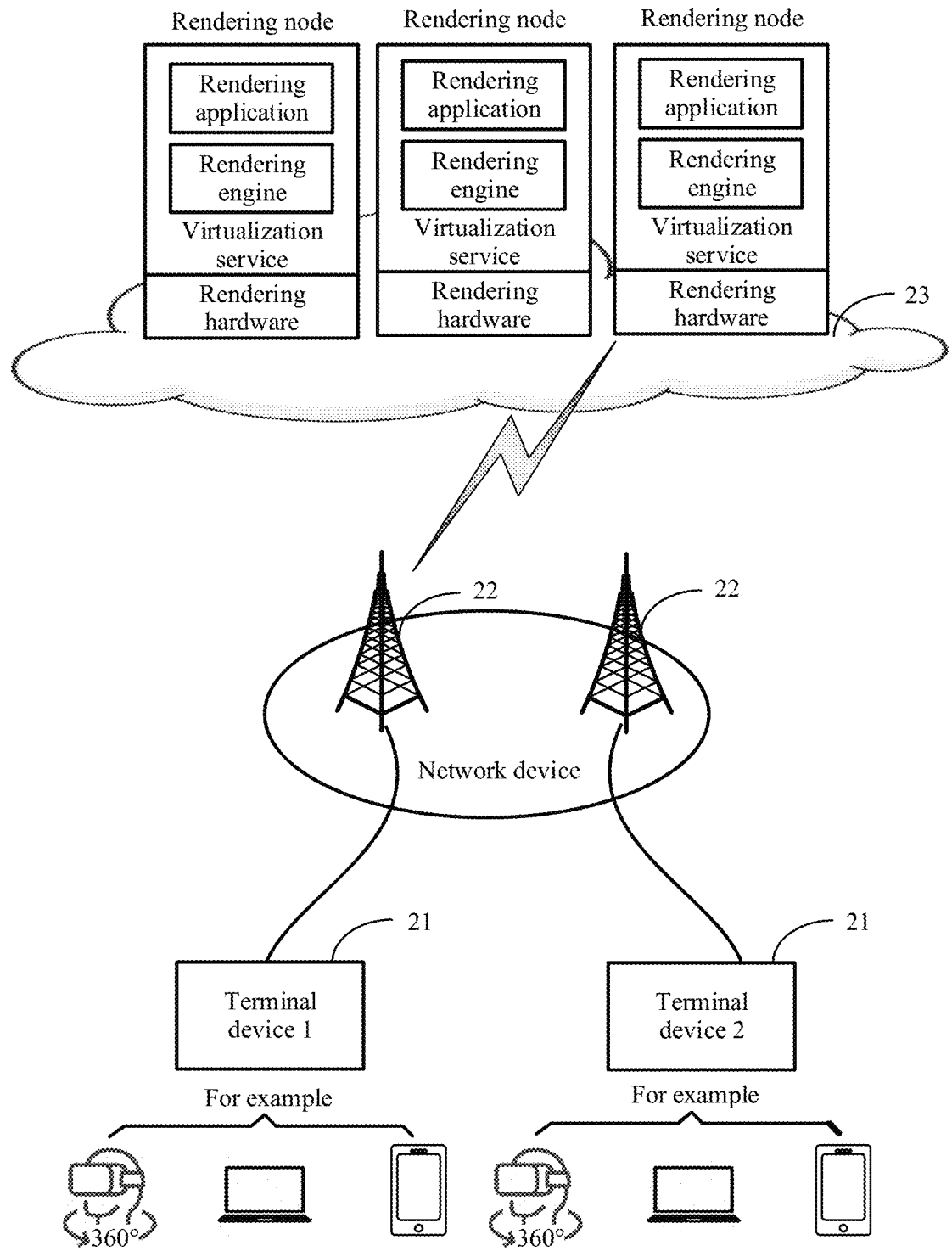
FIG. 1A and FIG. 1B are schematic diagrams of structures of some cloud rendering systems according to this application.
Figure 1B:
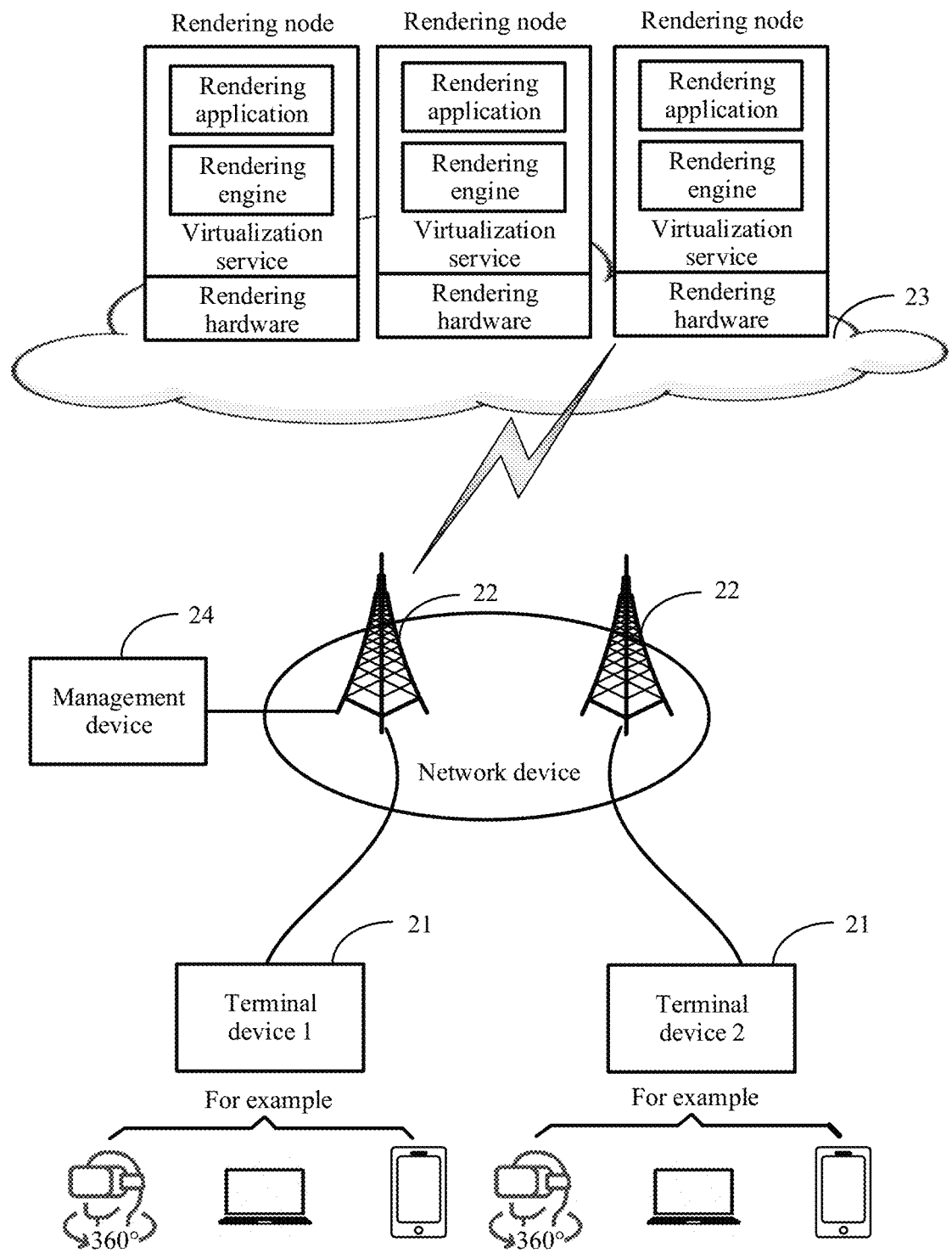

FIG. 1A and FIG. 1B are schematic diagrams of structures of some cloud rendering systems according to this application. As shown in FIG. 1A, the cloud rendering system in this application may include a plurality of terminal devices 21, a network device 22, and a rendering platform 23. The terminal devices 21 may include a terminal device 1 and a terminal device 2.

The terminal device 21 may be a device that needs to display a rendered image in real time, for example, may be a virtual reality (VR) device used for flight training, or may be a computer used for a virtual game or a smartphone used for a virtual shopping mall. This is not limited herein. The terminal device 21 may be a device with a high computing capability and a high storage capability, or may be a device with a low computing capability and a low storage capability but a high input/output capability, for example, a thin terminal or a cloud terminal.

The network device 22 is configured to transmit data between the terminal device 21 and the rendering platform 23 by using a communication network of any communication mechanism or communication standard. The communication network may be in a form of a wide area network, a local area network, a point-to-point connection, or the like, or any combination thereof.

The rendering platform 23 includes a plurality of rendering nodes, and each rendering node includes rendering hardware, a virtual machine, an operating system, a rendering engine, and a rendering application from bottom to top. The rendering hardware includes a computing resource pool, a storage resource pool, and a network resource pool. The computing resource pool, the storage resource pool, and the network resource pool are all unified resource pools formed by decoupling physical hardware resources from upper-layer applications by using a virtualization management program.

The computing resource pool may include a plurality of processors. The plurality of processors may have a homogeneous structure or a heterogeneous structure. The processor may include one or more processing cores. The processor may include an x86 processor, an application processor (AP), a modem processor, a graphics processing unit (GPU), an image signal processor (ISP), a controller, a memory, a video codec, a digital signal processor (DSP), a baseband processor, a neural-network processing unit (NPU), and/or the like. In a possible embodiment, the computing resource pool may include a plurality of servers, and each server includes one or more processors. In addition, the server may further include a memory, a hard disk, and the like. This is not limited herein.

The storage resource pool may include a plurality of memories and a plurality of hard disks. The plurality of hard disks may have a homogeneous structure or a heterogeneous structure. The hard disks may include a hard disk drive (Hard Disk Drive, HDD), a solid state drive (SSD), a hybrid hard drive (HHD), and the like.

The network resource pool may include a plurality of network interface cards, a plurality of routers, a plurality of switches, a plurality of firewalls, a plurality of load balancers, and the like. The plurality of network interface cards may have a homogeneous structure or a heterogeneous structure. The network interface cards may include a standard Ethernet card and a PCMCIA network interface card, or may include a wireless network interface card and a fiber-optic network interface card, or may include an Ethernet card and a token-ring network interface card, or may include a 100M network interface card, a gigabit network interface card, and an intelligent network interface card, or the like. The plurality of routers may include a backbone-level router, an enterprise-level router, and an access-level router, or may include a border router and an intermediate node router, or the like. The switches may include a wide area network switch and a local area network switch, or may include an Ethernet switch, a fast Ethernet switch, a gigabit Ethernet switch, an FDDI switch, an ATM switch, and a token-ring switch, or may include an enterprise-level switch, a departmental-level switch, and a working group switch, or the like. The firewalls may include a filter-type firewall and an application proxy-type firewall. The load balancers may include a local load balancer and a global load balancer.

Herein, computing resources in the computing resource pool may be divided into a plurality of computing unit resources, storage resources in the storage resource pool may be divided into a plurality of storage unit resources, and network resources in the network resource pool may be divided into a plurality of network unit resources. Therefore, the rendering platform may perform free combination based on the unit resources according to a resource requirement of a user, to provide a resource according to a requirement of the user. For example, the computing resources may be divided into 5u computing unit resources, and the storage resources may be divided into 10G storage unit resources. In this case, combinations of the computing resources and the storage resources may be 5u+10G, 5u+20G, 5u+30u, 10u+10G, 10u+20G, 10u+30u, . . . . A virtualization service is a service that builds resources of a plurality of physical hosts into a unified resource pool by using a virtualization technology and flexibly isolates independent resources according to a requirement of a user to run an application program of the user. Usually, the virtualization service may include a virtual machine (VM) service, a bare metal server (BMS) service, and a container (Container) service. The VM service may be a service that generates, through virtualization, a virtual machine (VM) resource pool on a plurality of physical hosts by using a virtualization technology to provide a VM on demand for a user to use. The BMS service is a service that generates, through virtualization, a BMS resource pool on a plurality of physical hosts to provide a BMS on demand for a user to use. The container service is a service that generates, through virtualization, a container resource pool on a plurality of physical hosts to provide a container on demand for a user to use. The VM is a simulated virtual computer, that is, a logical computer. The BMS is a scalable high-performance computing service whose computing performance is the same as that of a conventional physical machine, and has a feature of secure physical isolation. The container is a kernel virtualization technology capable of providing lightweight virtualization to isolate user spaces, processes, and resources. It should be understood that the VM service, the BMS service, and the container service in the virtualization service are merely specific examples. In actual application, the virtualization service may be alternatively another lightweight or heavyweight virtualization service. This is not limited herein. The rendering engine may include a ray tracing renderer, a rasterized rendering pipeline, or the like. The rendering application may be configured to invoke the rendering engine to complete rendering of a rendered image. Common rendering applications may include a game application, a VR application, a movie special effect, an animation, and the like.

The cloud rendering system shown in FIG. 1B further includes a management device. The management device may be a third-party device. For example, the terminal device may be a device on which an application program for a user to play a 3D game is located, and the management device may be a device of a game developer that provides the application program of the 3D game. This is not limited herein.

The following separately describes in detail problems in a single-user scenario and a multi-user scenario.

The single-user scenario means that a single user exclusively occupies a scene, for example, a standalone-edition mission accomplishment game played by a user. In the single-user scenario, a same scene or similar scenes may appear at different time nodes. For example, when the user plays the mission accomplishment game at a first time node, the user fails to accomplish a target mission, and when the user continues to play the mission accomplishment game at a second time node, the game starts from the target mission again. It is conceivable that a scene of the target mission that needs to be rendered at the first time node is completely the same as or highly similar to a scene of the target mission that needs to be rendered at the second time node.

The cloud rendering system shown in FIG. 1A is used as an example. The terminal device 1 independently and separately renders, by using resources of the rendering platform 23, the scene of the target mission that needs to be rendered at the first time node and the scene of the target mission that needs to be rendered at the second time node, to obtain a first rendered image and a second rendered image. Details are as follows:

The terminal device 1 sends a first rendering request to the rendering platform 23 at the first time node by using the network device 22, and the rendering platform 23 invokes the rendering engine to render a first virtual scene according to the first rendering request, to obtain the first rendered image.

The terminal device 1 sends a second rendering request to the rendering platform 23 at the second time node by using the network device 22, and the rendering platform 23 invokes the rendering engine to render a second virtual scene according to the second rendering request, to obtain the second rendered image.

In the foregoing virtual scene in which a single user participates, description is provided by using an example in which the cloud rendering system includes two time nodes: the first time node and the second time node. In actual application, the user may be unable to accomplish the target mission at a plurality of time nodes. Therefore, a large amount of computation is repetitive, causing an unnecessary waste of computing resources.

Figure 2:
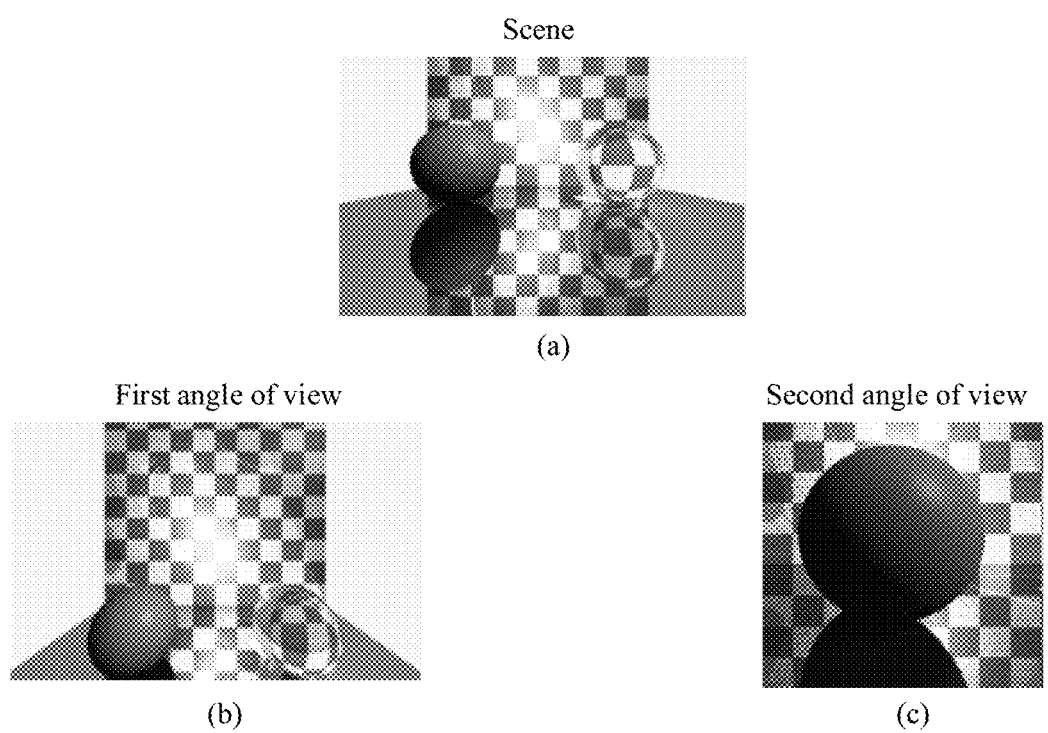
FIG. 2 is a schematic diagram of viewing a same scene from different angles of view according to this application.

The multi-user scenario means that a plurality of users share a same scene. For example, different users go shopping in a same virtual shopping mall, or different users play a simulated first-person shooting game in a same gun battle scene. To enable each user to have a realistic feeling of being in the scene, rendered images of the same scene usually need to be generated from different angles for different users. As shown in FIG. 2, it is assumed that the scene is shown in (a) of FIG. 2, and the scene includes a light source at the back, an opaque object on the left, and a transparent object on the right. When a first user performs observation from a first angle of view (performing observation from an uptilt angle in the front), a rendered image that needs to be generated is shown in (b) of FIG. 2, and the light source, the opaque object on the left, and the transparent object on the right can be seen. When a second user performs observation from a second angle of view (performing observation from an angle on the left), a rendered image that needs to be generated is shown in (c) of FIG. 2, and it can be seen that the opaque object on the left blocks the transparent object on the right.

The cloud rendering system shown in FIG. 1A is used as an example. The terminal device 1 and the terminal device 2 may independently and separately render the scene by using resources of the rendering platform 23, to obtain rendered images from different angles. Details are as follows:

The terminal device 1 sends a first rendering request to the rendering platform 23 by using the network device 22, and the rendering platform 23 invokes the rendering engine to render the scene from the first angle of view of the first user according to the first rendering request, to obtain a rendered image of the scene that is generated from the first angle of view of the first user, as shown in (b) of FIG. 2.

The terminal device 2 sends a second rendering request to the rendering platform 23 by using the network device 22, and the rendering platform 23 invokes the rendering engine to render the scene from the second angle of view of the second user according to the second rendering request, to obtain a rendered image of the scene that is generated from the second angle of view of the second user, as shown in (c) of FIG. 2.

In the foregoing multi-user scenario, description is provided by using an example in which the cloud rendering system includes only the terminal device 1 and the terminal device 2. In actual application, there are far more than two terminal devices, and users of different terminal devices usually have different angles of view. Therefore, as a quantity of users increases, a quantity of rendered images from different angles of view that need to be generated also increases, and an amount of computation is quite large. In addition, different terminal devices need to display rendered images from different angles that are obtained by rendering a same scene, and a large amount of computation is repetitive, causing an unnecessary waste of computing resources. In addition, in the multi-user scenario, there is also a problem that a same scene or similar scenes appear at different time nodes. Therefore, this part of computation is also repetitive.

To resolve the foregoing problems, this application provides a rendering method, a device, and a system, to effectively reduce a waste of computing resources.

A scene usually includes a light source and a three-dimensional model, and light generated by the light source is irradiated onto the three-dimensional model. When light sources or three-dimensional models are the same, scenes are the same. When either light sources or three-dimensional models are different, scenes are different. The light source may be a natural light source, a point light source, a line light source, an area light source, or the like. The three-dimensional model may be a spherical, cuboid-shaped, cubic, tapered, or even irregular object. Each scene may have a unique scene identifier. When scene identifiers are the same, scenes are the same. When scene identifiers are different, scenes are different.

A grid is a polygon obtained by dividing a surface of a three-dimensional model in a scene, that is, the grid is some regions of the surface of the three-dimensional model in the scene. Shapes of grids of three-dimensional models in different shapes may be different. For example, shapes of a grid of a sphere and a grid of a curved-surface object may be completely different. Each unit facet may have a unique grid identifier. The following separately describes the grid with reference to specific embodiments.

Figure 3A:
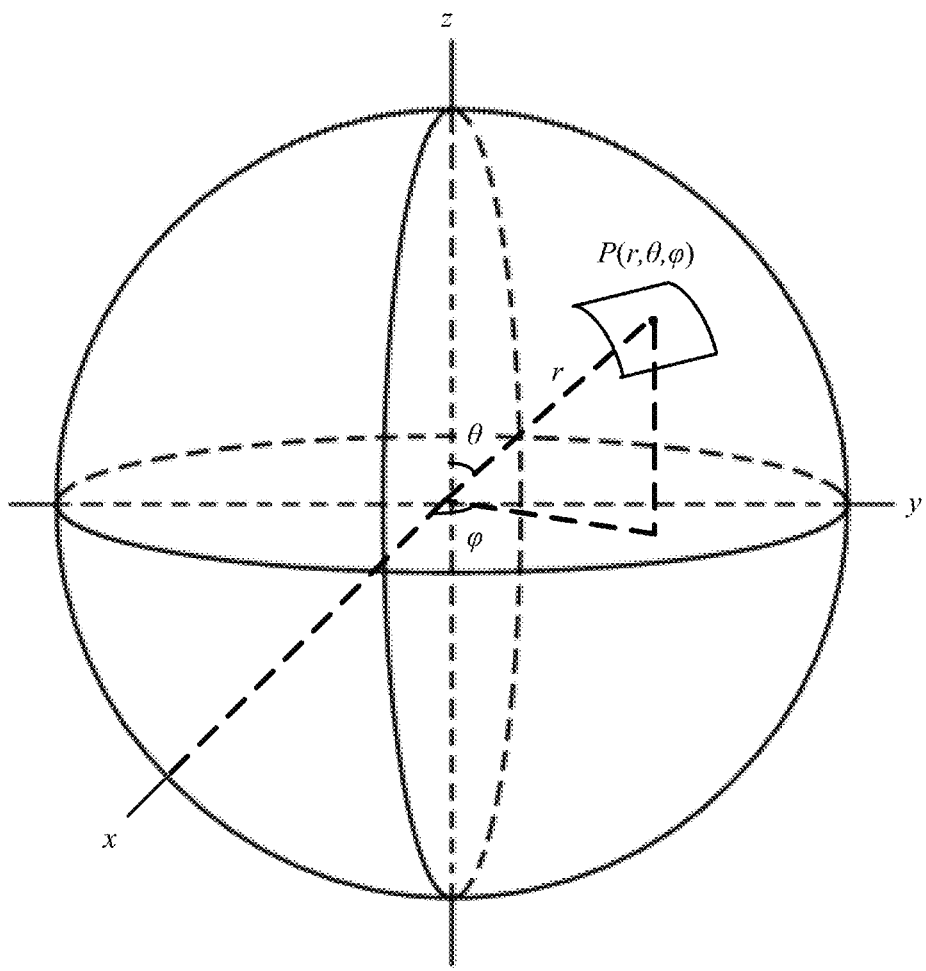
FIG. 3A and FIG. 3B are schematic diagrams of structures of some grids according to this application.

As shown in FIG. 3A, for example, the three-dimensional model is a sphere, and the grid may be represented as an approximately square block, on a surface of the sphere, whose four sides are slightly bulging and that is constituted by a center point $P(r,\theta,\varphi)$ and points in a neighborhood of the center point $P(r,\theta,\varphi)$. A three-dimensional orthogonal coordinate system is constructed by using a sphere center of the sphere as an origin, and the three-dimensional orthogonal coordinate system includes an x axis, a Y axis, and a z axis. In coordinates of the center point P, r is represented as a length of a line segment OP from the sphere center O to the center point P, $\theta$ is represented as an included angle between the line segment OP and a positive z axis, and $\varphi$ is represented as an included angle between a projection of the line segment OP on an xoy plane and the x axis. In a specific embodiment, n center points $P_1, P_2, \ldots, P_n$ may be evenly arranged on the sphere. If a distance between a non-center point $Q_j$ and the center point $P_i$ is the shortest, the non-center point $Q_j$ and the center point $P_i$ belong to a same grid.

Figure 3B:
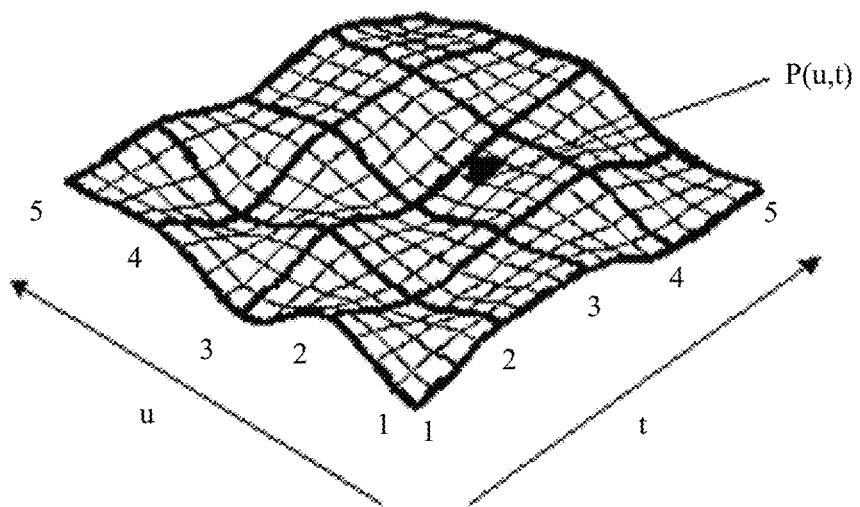

As shown in FIG. 3B, for example, the three-dimensional model is a curved-surface object, and the grid may be represented as a square block on a curved surface represented by $P(u,t)$. A two-dimensional orthogonal coordinate system is constructed by using a specified origin on the curved surface, and the coordinate system includes a u axis and a t axis. u is represented as an offset in one direction of the specified origin on the curved surface, t is represented as an offset in the other orthogonal direction, and $P(u,t)$ is represented as a square block constituted by four vertices in the (u, t) coordinate system shown in FIG. 3B.

It can be understood that the foregoing shapes of the grid are merely specific examples. In actual application, the grid may be alternatively in another shape. This is not limited herein. In addition, a size of the grid may be set as required. When a requirement for precision is higher, the size of the grid may be set to be smaller. When a requirement for precision is lower, the size of the grid may be set to be larger.

A coloring result of the grid includes illumination intensity, a color, and the like of the grid. When a common RBG color model is used for representation, the illumination intensity of the grid may be represented by using a grayscale. When a grayscale value is smaller, it indicates the illumination intensity of the grid is higher. When a grayscale value is larger, it indicates that the illumination intensity of the grid is lower. The color of the grid may be expressed by using a ratio of RBG. For example, if the ratio of R:B:G is 1:1:1, the color of the grid is white; or if the ratio of R:B:G is 1:0:0, the color of the grid is red.

Influential variables of the coloring result of the grid are diverse, for example, a scene identifier, a grid identifier, a light source quantity, a light source type, a light source position, a grid normal angle, a grid material, and a grid position. The scene identifier is a unique identifier of a scene. The grid identifier is a unique identifier of the grid. The light source quantity is a light source quantity in the scene. For example, the light source quantity may be 1, 2, 3, or more. The light source type is a type of the light source in the scene. For example, the light source type may be a point light source, a line light source, an area light source, or a natural light source. The light source position is a position, in world coordinates, of the light source in the scene. For example, the light source position may be represented as P(X, Y, Z), where X is a projection of the light source on an x axis of the world coordinates, Y is a projection of the light source on a Y axis of the world coordinates, and Z is a projection of the light source on a z axis of the world coordinates. The grid normal angle is an angle of a normal line perpendicular to the grid relative to the world coordinates. The grid material is a material used for the grid, for example, a light-transmitting material (for example, glass or a water drop), a light-reflecting material (for example, a mirror surface or a water surface), or a light-absorbing material (for example, wood or cloth). The grid position is a position of the grid in the world coordinates. For example, the position of the grid is Q($\tilde{X}$, $\tilde{Y}$, $\tilde{Z}$), where $\tilde{X}$ is a projection of the light source on the x axis of the world coordinates, $\tilde{Y}$ is a projection of the light source on the Y axis of the world coordinates, and $\tilde{Z}$ is a projection of the light source on the z axis of the world coordinates. When other factors remain unchanged, if the scene identifier and the grid identifier are the same, illumination intensity of the grid and a color of the grid are also the same. When other factors remain unchanged, a larger quantity of light sources indicates higher illumination intensity of the grid, and a smaller quantity of light sources indicates lower illumination intensity of the grid. When other factors remain unchanged, illumination intensity of the grid that is obtained when the light source type is the area light source is higher than illumination intensity of the grid that is obtained when the light source type is the line light source, and the illumination intensity of the grid that is obtained when the light source type is the line light source is higher than illumination intensity of the grid that is obtained when the light source type is the point light source. When other factors remain unchanged, illumination intensity of the grid that is obtained when the light source is closer to the grid is higher than illumination intensity of the grid that is obtained when the light source is farther away from the grid. When other factors remain unchanged, illumination intensity of the grid that is obtained when the grid normal angle points to the light source is higher than illumination intensity of the grid that is obtained when the grid normal angle deviates from the light source. When other factors remain unchanged, light intensity of the grid that is obtained when the grid material is the light-reflecting material is higher than light intensity of the grid that is obtained when the grid material is the light-absorbing material. When other factors remain unchanged, light intensity obtained when the grid position is a position closer to the light source is higher than light intensity obtained when the grid position is a position farther away from the light source.

The foregoing influential variables of the coloring result of the grid are merely specific examples. In actual application, the influential variables of the coloring result of the grid may further include quantities of reflections and refractions of light of the light source before the light reaches the grid, and the like. This is not limited herein.

Figure 4:
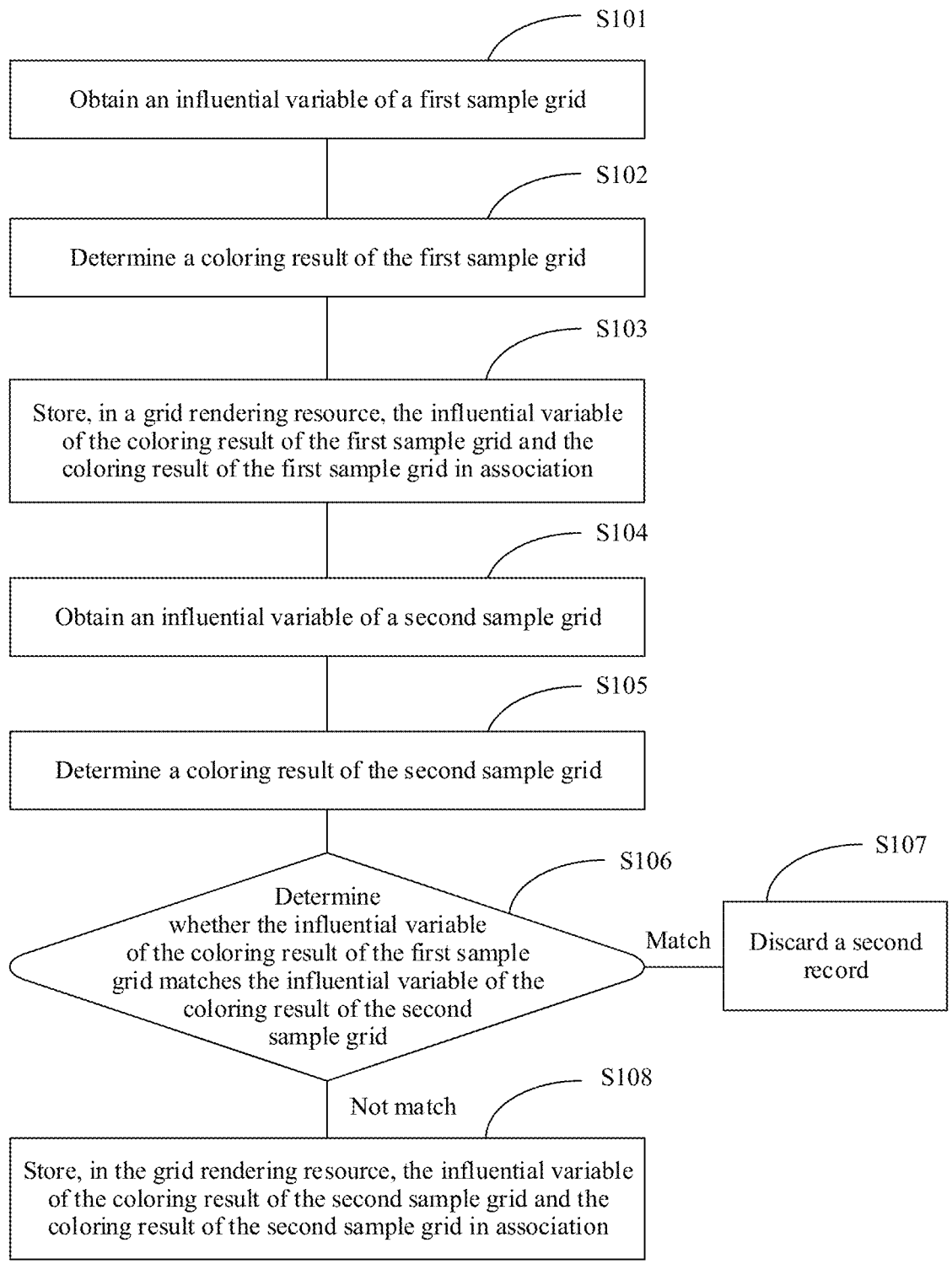
FIG. 4 is a schematic flowchart of a method for establishing a grid rendering resource according to this application.

FIG. 4 is a schematic flowchart of a method for establishing a grid rendering resource according to this application. The method for establishing a grid rendering resource in this implementation includes the following operations.

S101: A rendering platform obtains an influential variable of a coloring result of a first sample grid, where the first sample grid includes some regions of a surface of a three-dimensional model.

S102: The rendering platform determines the coloring result of the first sample grid.

S103: The rendering platform stores, in a grid rendering resource, the influential variable of the coloring result of the first sample grid and the coloring result of the first sample grid in association.

S104: The rendering platform obtains an influential variable of a coloring result of a second sample grid, where the second sample grid includes some regions of a surface of a three-dimensional model in a second sample scene.

S105: The rendering platform determines the coloring result of the second sample grid.

S106: The rendering platform determines whether the influential variable of the coloring result of the first sample grid matches the influential variable of the coloring result of the second sample grid.

S107: When the influential variable of the coloring result of the first sample grid matches the influential variable of the coloring result of the second sample grid, discard the coloring result of the second sample grid.

S108: When the influential variable of the coloring result of the first sample grid does not match the influential variable of the coloring result of the second sample grid, store, in the grid rendering resource, the influential variable of the coloring result of the second sample grid and the coloring result of the second sample grid in association.

In a specific embodiment of this application, the first sample grid may be a polygon obtained by dividing a three-dimensional model in a first sample scene, and the second sample grid may be a polygon obtained by dividing the three-dimensional model in the second sample scene.

In a specific embodiment of this application, the first sample scene and the second sample scene may be a same scene, that is, the first sample scene and the second sample scene have a same scene identifier; or may be different scenes, that is, the first sample scene and the second sample scene have different scene identifiers. This is not limited herein.

In a specific embodiment of this application, the first sample scene may be a scene at a first time node, and the second sample scene may be a scene at a second time node. A time interval between the first time node and the second time node may be 0, at a level of seconds, at a level of minutes, at a level of hours, at a level of days, at a level of months, or even at a level of years. For example, the time interval between the first time node and the second time node may be 3 minutes, or the time interval between the first time node and the second time node may be 1 day.

In a specific embodiment of this application, for the first sample scene, the first sample grid, the influential variable of the first sample grid, the coloring result of the first sample grid, and a relationship thereof, and the second sample scene, the second sample grid, the influential variable of the second sample grid, the coloring result of the second sample grid, and a relationship thereof, refer to the relationship between the scene, the grid, the influential variable of the grid, and the coloring result of the grid in the foregoing descriptions. Details are not described herein again.

In a specific embodiment of this application, that the rendering platform determines whether the influential variable of the coloring result of the first sample grid matches the influential variable of the coloring result of the second sample grid includes at least the following three manners:

In a first manner, the influential variable of the coloring result of the first sample grid includes a scene identifier and a grid identifier, and the influential variable of the coloring result of the second sample grid also includes a scene identifier and a grid identifier. In this case, if the scene identifier of the coloring result of the first sample grid is the same as the scene identifier of the influential variable of the coloring result of the second sample grid, and the grid identifier of the coloring result of the first sample grid is the same as or similar to the grid identifier of the influential variable of the coloring result of the second sample grid, it can be determined that the influential variable of the coloring result of the first sample grid matches the influential variable of the coloring result of the second sample grid. If the scene identifier of the coloring result of the first sample grid is different from the scene identifier of the coloring result of the second sample grid, or if the scene identifier of the coloring result of the first sample grid is the same as the scene identifier of the coloring result of the second sample grid, but the grid identifier of the coloring result of the first sample grid is different from and is not similar to the grid identifier of the coloring result of the second sample grid, it can be determined that the influential variable of the coloring result of the first sample grid does not match the influential variable of the coloring result of the second sample grid.

In a second manner, the influential variable of the coloring result of the first sample grid includes a light source quantity, a light source type, a light source position, a grid normal angle, a grid material, and a grid position, and the influential variable of the coloring result of the second sample grid also includes a light source quantity, a light source type, a light source position, a grid normal angle, a grid material, and a grid position. In this case, if a similarity between the influential variable of the coloring result of the first sample grid and the influential variable of the coloring result of the second sample grid is greater than a first threshold, the influential variable of the coloring result of the first sample grid matches the influential variable of the coloring result of the second sample grid. On the contrary, if a similarity between the influential variable of the coloring result of the first sample grid and the influential variable of the coloring result of the second sample grid is less than or equal to the first threshold, the influential variable of the coloring result of the first sample grid does not match the influential variable of the coloring result of the second sample grid. It should be understood that, in the foregoing example, description is provided by using an example in which elements in the influential variable include the light source quantity, the light source type, the light source position, the grid normal angle, the grid material, and the grid position. In actual application, the influential variable may include fewer, more, or other elements. It only needs to be ensured that elements in the influential variable of the coloring result of the first sample grid are the same as elements in the influential variable of the coloring result of the second sample grid.

In a third manner, the influential variable of the coloring result of the first sample grid includes a scene identifier, a grid identifier, a light source quantity, a light source type, a light source position, a grid normal angle, a grid material, and a grid position, and the influential variable of the coloring result of the second sample grid also includes a scene identifier, a grid identifier, a light source quantity, a light source type, a light source position, a grid normal angle, a grid material, and a grid position. In this case, the rendering platform first compares the scene identifier of the coloring result of the first sample grid with the scene identifier of the influential variable of the coloring result of the second sample grid. If the scene identifier of the coloring result of the first sample grid is the same as the scene identifier of the influential variable of the coloring result of the second sample grid, the rendering platform compares the grid identifier of the coloring result of the first sample grid with the grid identifier of the influential variable of the coloring result of the second sample grid; and if the grid identifier of the coloring result of the first sample grid is the same as the grid identifier of the influential variable of the coloring result of the second sample grid, the rendering platform determines that the influential variable of the coloring result of the first sample grid matches the influential variable of the coloring result of the second sample grid. If the scene identifier of the coloring result of the first sample grid is different from the scene identifier of the influential variable of the coloring result of the second sample grid, the rendering platform determines whether the light source quantity, the light source type, the light source position, the grid normal angle, the grid material, and the grid position of the coloring result of the first sample grid have a similarity, greater than a first threshold, to the light source quantity, the light source type, the light source position, the grid normal angle, the grid material, and the grid position of the coloring result of the second sample grid. If the similarity is greater than the first threshold, the influential variable of the coloring result of the first sample grid matches the influential variable of the coloring result of the second sample grid; or if the similarity is less than or equal to the first threshold, the influential variable of the coloring result of the first sample grid does not match the influential variable of the coloring result of the second sample grid.

In a specific embodiment of this application, the similarity between the influential variable of the coloring result of the first sample grid and the influential variable of the coloring result of the second sample grid may be calculated by using the following algorithm: for example, a cosine similarity, a Euclidean distance method, a Pearson similarity, a Pearson correlation coefficient, or a Jaccard similarity coefficient. This is not limited herein.

In a specific embodiment of this application, the similarity between the influential variable of the coloring result of the first sample grid and the influential variable of the coloring result of the second sample grid may be calculated by using the following formula:

$$\cos\theta_1 = \frac{\sum_{1}^{n} x_n y_n}{\prod_{1}^{n} \sqrt{x_n^2 + y_n^2}},$$

where $\cos\theta_1$ is the similarity between the influential variable of the coloring result of the first sample grid and the influential variable of the coloring result of the second sample grid, $x_1, x_2, \ldots, x_n$ is the influential variable of the coloring result of the first sample grid, and $y_1, y_2, \ldots, y_n$ is the influential variable of the coloring result of the second sample grid.

In a specific embodiment of this application, the grid rendering resource may be a database, a data table, or another data structure. This is not limited herein. The grid rendering resource may be a spatio-temporal database. To be specific, a user A may store, in the grid rendering resource, a sample grid in a sample scene generated at a time node a, to provide the sample grid for the user A to use at a time node b; or a user A may store, in the grid rendering resource, a sample grid in a sample scene generated at a time node a, to provide the sample grid for a user B to use at a time node a (the time node a of the user A is slightly earlier than the time node a of the user B, and this is ignored herein); or a user A may store, in the grid rendering resource, a sample grid in a sample scene generated at a time node a, to provide the sample grid for a use B to use at a time node b.

In a specific embodiment of this application, the grid rendering resource may be a grid rendering resource shown in Table 1.

TABLE 1

| | | | Grid rendering resource | | | | |
|---|---|---|---|---|---|---|---|
| | | | Influential variable | | | | |
| Sample facet | Light source quantity | Light source type | Light source position | Facet normal angle | Facet material | Facet position | Coloring result |
| Sample facet 1 (first sample facet) | 2 | One point light source + one line light source | $P(X_1, Y_1, Z_1) +$ $P(X_2, Y_2, Z_2)$ | 30 degrees | Mirror surface | $Q(\tilde{X}_1, \tilde{Y}_1, \tilde{Z}_1) +$ $Q(\tilde{X}_2, \tilde{Y}_2, \tilde{Z}_2)$ | RGB (225, 225, 255) |
| Sample facet 2 (second sample facet) | 2 | One point light source + one line light source | $P(X_3, Y_3, Z_3) +$ $P(X_4, Y_4, Z_4)$ | 25 degrees | Wood | $Q(\tilde{X}_3, \tilde{Y}_3, \tilde{Z}_3) +$ $Q(\tilde{X}_4, \tilde{Y}_4, \tilde{Z}_4)$ | RGB (176, 157, 98) |
| Sample facet 3 | 2 | One point light source + one line light source | $P(X_5, Y_5, Z_5) +$ $P(X_6, Y_6, Z_6)$ | 60 degrees | Cloth | $Q(\tilde{X}_5, \tilde{Y}_5, \tilde{Z}_5) +$ $Q(\tilde{X}_6, \tilde{Y}_6, \tilde{Z}_6)$ | RGB (168, 96, 183) |
| ... | ... | ... | ... | ... | ... | ... | ... |

It can be understood that the foregoing Table 1 is merely a specific example. In actual application, an influential variable of a coloring result of a sample grid may further include quantities of reflections and refractions of light of a light source before the light reaches the sample grid, a light source quantity may be 1, 3, or more, a light source type may be a point light source, a line light source, an area light source, or another combination thereof, a light source position may be another position, a grid normal angle may be another angle, a grid material may be another material such as metal, a grid position may be another position, and a coloring result may be another coloring result. This is not limited herein.

In a specific embodiment of this application, operation S107 may be alternatively replaced with the following operation: When the influential variable of the coloring result of the first sample grid matches the influential variable of the coloring result of the second sample grid, the rendering platform determines a first average value of the influential variable of the coloring result of the first sample grid and the influential variable of the coloring result of the second sample grid, determines a second average value of the coloring result of the first sample grid and the coloring result of the second sample grid, and stores, in the grid rendering resource, the first average value and the second average value in association. Herein, the first average value and the second average value may be weighted average values. In addition, the influential variable of the coloring result of the first sample grid and the coloring result of the first sample grid may be deleted, and the influential variable of the coloring result of the second sample grid and the coloring result of the second sample grid may be discarded. Alternatively, the influential variable of the coloring result of the first sample grid, the coloring result of the first sample grid, the influential variable of the coloring result of the second sample grid, and the coloring result of the second sample grid may be transferred to a storage space with a low access speed but a large capacity for storage.

After the grid rendering resource is established, the rendering platform may determine a coloring result of a to-be-processed grid by using a coloring result, stored in the grid rendering resource, of a sample grid.

Figure 5:
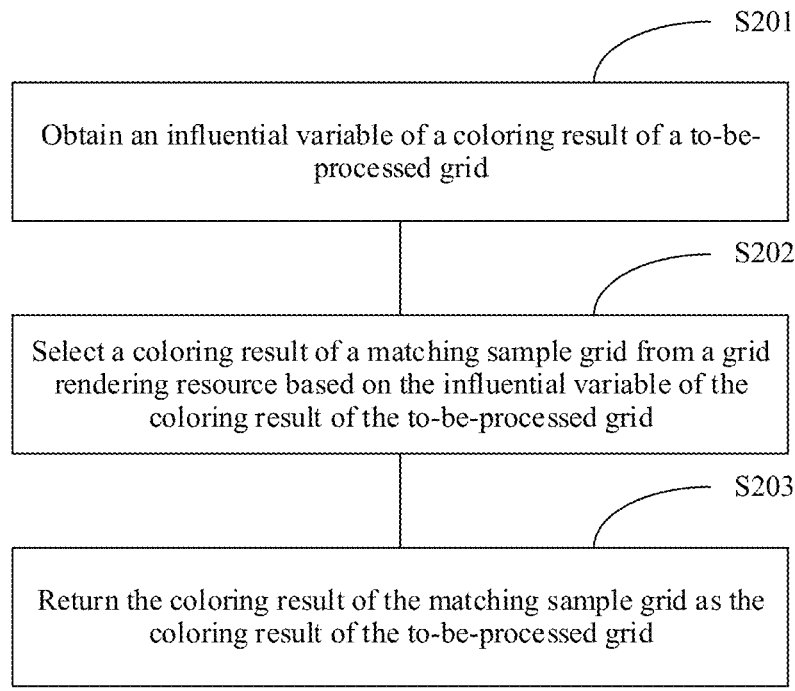
FIG. 5 is a schematic flowchart of a rendering method according to this application.

FIG. 5 is a schematic flowchart of a rendering method according to this application. The rendering method in this implementation includes the following operations.

S201: A rendering platform obtains an influential variable of a coloring result of a to-be-processed grid, where the to-be-processed grid includes some regions of a surface of a three-dimensional model.

S202: The rendering platform selects a coloring result of a matching sample grid from a grid rendering resource based on the influential variable of the coloring result of the to-be-processed grid, where the grid rendering resource stores influential variables of coloring results of a plurality of sample grids and corresponding coloring results of the plurality of sample grids.

S203: The rendering platform returns the coloring result of the matching sample grid as the coloring result of the to-be-processed grid.

In a specific embodiment of this application, the to-be-processed grid may be a polygon obtained by dividing a three-dimensional model in a to-be-processed scene, and the sample grid may be a polygon obtained by dividing a three-dimensional model in a sample scene (for example, the first sample scene and the second sample scene in the embodiment shown in FIG. 4).

In a specific embodiment of this application, the to-be-processed scene and the sample scene may be a same scene, that is, the to-be-processed scene and the sample scene have a same scene identifier; or may be different scenes, that is, the to-be-processed scene and the sample scene have different scene identifiers. This is not limited herein.

In a specific embodiment of this application, the to-be-processed scene may be a scene at a first time node, and the sample scene may be a scene at a second time node. A time interval between the first time node and the second time node may be 0, at a level of seconds, at a level of minutes, at a level of hours, at a level of days, at a level of months, or even at a level of years. For example, the time interval between the first time node and the second time node may be 3 minutes, or the time interval between the first time node and the second time node may be 1 day.

In a specific embodiment of this application, for the to-be-processed scene, the to-be-processed grid, the influential variable of the to-be-processed grid, the coloring result of the to-be-processed grid, and a relationship thereof, and the sample scene, the sample grid, the influential variable of the sample grid, the coloring result of the sample grid, and a relationship thereof, refer to the relationship between the scene, the grid, the influential variable of the grid, and the coloring result of the grid in the foregoing descriptions. Details are not described herein again.

In a specific embodiment of this application, that the rendering platform determines whether the influential variable of the coloring result of the to-be-processed grid matches the influential variable of the coloring result of the sample grid in the grid rendering resource includes at least the following three manners:

In a first manner, the influential variable of the coloring result of the to-be-processed grid includes a scene identifier and a grid identifier, and the influential variable of the coloring result of the sample grid also includes a scene identifier and a grid identifier. In this case, if the scene identifier of the coloring result of the to-be-processed grid is the same as the scene identifier of the influential variable of the coloring result of the sample grid, and the grid identifier of the coloring result of the to-be-processed grid is the same as or similar to the grid identifier of the influential variable of the coloring result of the sample grid, it can be determined that the influential variable of the coloring result of the to-be-processed grid matches the influential variable of the coloring result of the sample grid. If the scene identifier of the coloring result of the to-be-processed grid is different from the scene identifier of the coloring result of the sample grid, or if the scene identifier of the coloring result of the to-be-processed grid is the same as the scene identifier of the coloring result of the sample grid, but the grid identifier of the coloring result of the to-be-processed grid is different from and is not similar to the grid identifier of the coloring result of the sample grid, it can be determined that the influential variable of the coloring result of the to-be-processed grid does not match the influential variable of the coloring result of the sample grid.

In the foregoing solution, a search range can be effectively narrowed by using the scene identifier and the grid identifier, to quickly find the matching sample grid. It can be understood that, in many cases, a user has previously stored a sample grid of a three-dimensional model of a sample scene in the grid rendering resource, and when the user encounters the sample grid of the sample scene later, a coloring result of the sample grid of the sample scene may be found from the grid rendering resource by using a scene identifier and a grid identifier, thereby greatly narrowing a search range. For example, when the user plays a mission accomplishment game, if the user fails a mission last time, a scene and a grid that need to be rendered for the user last time are the same as a scene and a grid that need to be rendered this time, and the rendering platform only needs to use a grid coloring result obtained through last rendering, without repeatedly performing rendering again.

In a second manner, the influential variable of the coloring result of the to-be-processed grid includes a light source quantity, a light source type, a light source position, a grid normal angle, a grid material, and a grid position, and the influential variable of the coloring result of the sample grid also includes a light source quantity, a light source type, a light source position, a grid normal angle, a grid material, and a grid position. In this case, if a similarity between the influential variable of the coloring result of the to-be-processed grid and the influential variable of the coloring result of the sample grid is greater than a first threshold, the influential variable of the coloring result of the to-be-processed grid matches the influential variable of the coloring result of the sample grid. On the contrary, if a similarity between the influential variable of the coloring result of the to-be-processed grid and the influential variable of the coloring result of the sample grid is less than or equal to the first threshold, the influential variable of the coloring result of the to-be-processed grid does not match the influential variable of the coloring result of the sample grid. It should be understood that, in the foregoing example, description is provided by using an example in which elements in the influential variable include the light source quantity, the light source type, the light source position, the grid normal angle, the grid material, and the grid position. In actual application, the influential variable may include fewer, more, or other elements. It only needs to be ensured that elements in the influential variable of the coloring result of the to-be-processed grid are the same as elements in the influential variable of the coloring result of the sample grid.

In the foregoing solution, even if a scene of the to-be-processed grid is completely different from a scene of the sample grid, provided that the light source type, the light source position, the grid normal angle, the grid material, and the grid position of the to-be-processed grid are the same as or similar to the light source type, the light source position, the grid normal angle, the grid material, and the grid position of the sample grid, the coloring result of the sample grid can be used as the coloring result of the to-be-processed grid, thereby extending a range of a sample space of the grid rendering resource. For example, a coloring result of a grid that is a grid on a lake surface in a scene about a forest may also be used as a coloring result of a grid that is a grid on spring water in a scene about a desert.

In a third manner, the influential variable of the coloring result of the to-be-processed grid includes a scene identifier, a grid identifier, a light source quantity, a light source type, a light source position, a grid normal angle, a grid material, and a grid position, and the influential variable of the coloring result of the sample grid also includes a scene identifier, a grid identifier, a light source quantity, a light source type, a light source position, a grid normal angle, a grid material, and a grid position. In this case, the rendering platform first compares the scene identifier of the coloring result of the to-be-processed grid with the scene identifier of the influential variable of the coloring result of the sample grid. If the scene identifier of the coloring result of the to-be-processed grid is the same as the scene identifier of the influential variable of the coloring result of the sample grid, the rendering platform compares the grid identifier of the coloring result of the to-be-processed grid with the grid identifier of the influential variable of the coloring result of the sample grid; and if the grid identifier of the coloring result of the to-be-processed grid is the same as the grid identifier of the influential variable of the coloring result of the sample grid, the rendering platform determines that the influential variable of the coloring result of the to-be-processed grid matches the influential variable of the coloring result of the sample grid. If the scene identifier of the coloring result of the to-be-processed grid is different from the scene identifier of the influential variable of the coloring result of the sample grid, the rendering platform determines whether the light source quantity, the light source type, the light source position, the grid normal angle, the grid material, and the grid position of the coloring result of the to-be-processed grid have a similarity, greater than a first threshold, to the light source quantity, the light source type, the light source position, the grid normal angle, the grid material, and the grid position of the coloring result of the sample grid. If the similarity is greater than the first threshold, the influential variable of the coloring result of the to-be-processed grid matches the influential variable of the coloring result of the sample grid; or if the similarity is less than or equal to the first threshold, the influential variable of the coloring result of the to-be-processed grid does not match the influential variable of the coloring result of the sample grid.

In the foregoing solution, first, matching is performed between the to-be-processed grid and the sample grid in the grid rendering resource by using the scene identifier and the grid identifier, to perform searching within a small range, and increase a matching speed. When matching cannot be performed by using the scene identifier and the grid identifier, matching may be performed between the to-be-processed grid and the sample grid in the grid rendering resource by using the light source type, the light source position, the grid normal angle, the grid material, the grid position, and the like, to extend a search range and increase a hit ratio.

In a specific embodiment of this application, the similarity between the influential variable of the coloring result of the to-be-processed grid and the influential variable of the coloring result of the sample grid may be calculated by using the following algorithm: for example, a cosine similarity, a Euclidean distance method, a Pearson similarity, a Pearson correlation coefficient, or a Jaccard similarity coefficient. This is not limited herein.

In a specific embodiment of this application, the similarity between the influential variable of the coloring result of the to-be-processed grid and the influential variable of the coloring result of the sample grid may be calculated by using the following formula:

$$\cos\theta_2 = \frac{\sum_{1}^{m} x_m y_m}{\prod_{1}^{m} \sqrt{x_m^2 + y_m^2}},$$

where $\cos\theta_2$ is the similarity between the influential variable of the coloring result of the to-be-processed grid and the influential variable of the coloring result of the sample grid, $x_1, x_2, \ldots, x_m$ is the influential variable of the coloring result of the to-be-processed grid, and $y_1, y_2, y_m$ is the influential variable of the coloring result of the sample grid.

Figure 6:
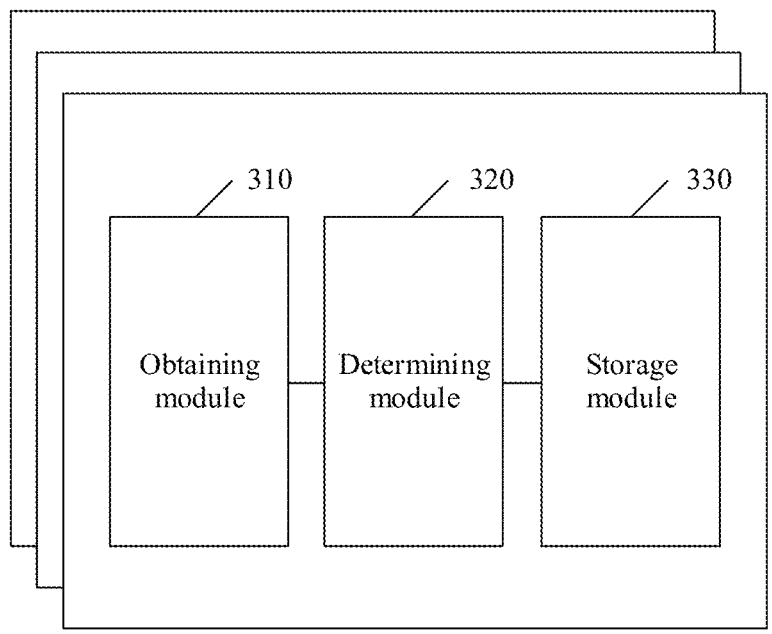
FIG. 6 is a schematic diagram of a structure of a rendering platform according to this application.

FIG. 6 is a schematic diagram of a structure of a rendering platform according to this application. The rendering platform in this embodiment includes an obtaining module 310, a determining module 320, and a storage module 330.

The obtaining module 310 is configured to obtain an influential variable of a coloring result of a first sample grid, where the first sample grid includes some regions of a surface of a three-dimensional model.

The determining module 320 is configured to determine the coloring result of the first sample grid.

The storage module 330 is configured to store, in a grid rendering resource, the influential variable of the coloring result of the first sample grid and the coloring result of the first sample grid in association.

The rendering platform in this embodiment is capable of performing the rendering method shown in FIG. 4. For details, refer to FIG. 4 and the related embodiment. Details are not described herein again.

Figure 7:
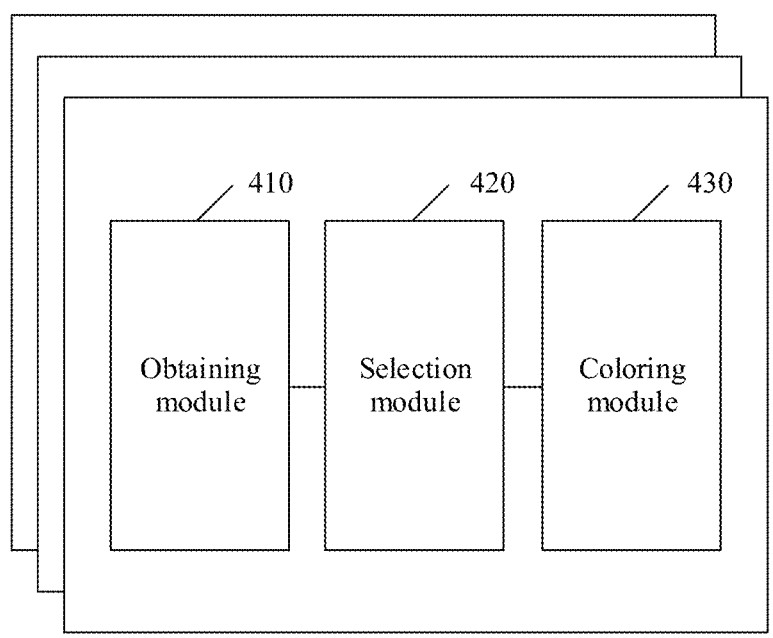
FIG. 7 is a schematic diagram of a structure of another rendering platform according to this application.

FIG. 7 is a schematic diagram of a structure of a rendering platform according to this application. The rendering platform in this embodiment includes an obtaining module 410, a selection module 420, and a coloring module 430.

The obtaining module 410 is configured to obtain an influential variable of a coloring result of a to-be-processed grid, where the to-be-processed grid includes some regions of a surface of a three-dimensional model.

The selection module 420 is configured to select a coloring result of a matching sample grid from a grid rendering resource based on the influential variable of the coloring result of the to-be-processed grid, where the grid rendering resource stores influential variables of coloring results of a plurality of sample grids and corresponding coloring results of the plurality of sample grids.

The coloring module 430 is configured to return the coloring result of the matching sample grid as the coloring result of the to-be-processed grid.

The rendering platform in this embodiment is capable of performing the rendering method shown in FIG. 5. For details, refer to FIG. 5 and the related embodiment. Details are not described herein again.

A cloud rendering system in an embodiment provided in this application includes a terminal device, a network device, and a rendering platform. The terminal device may communicate with the rendering platform by using the network device. The terminal device may be a VR device, a computer, a smartphone, or the like. The rendering platform includes one or more cloud rendering nodes.

Figure 8:
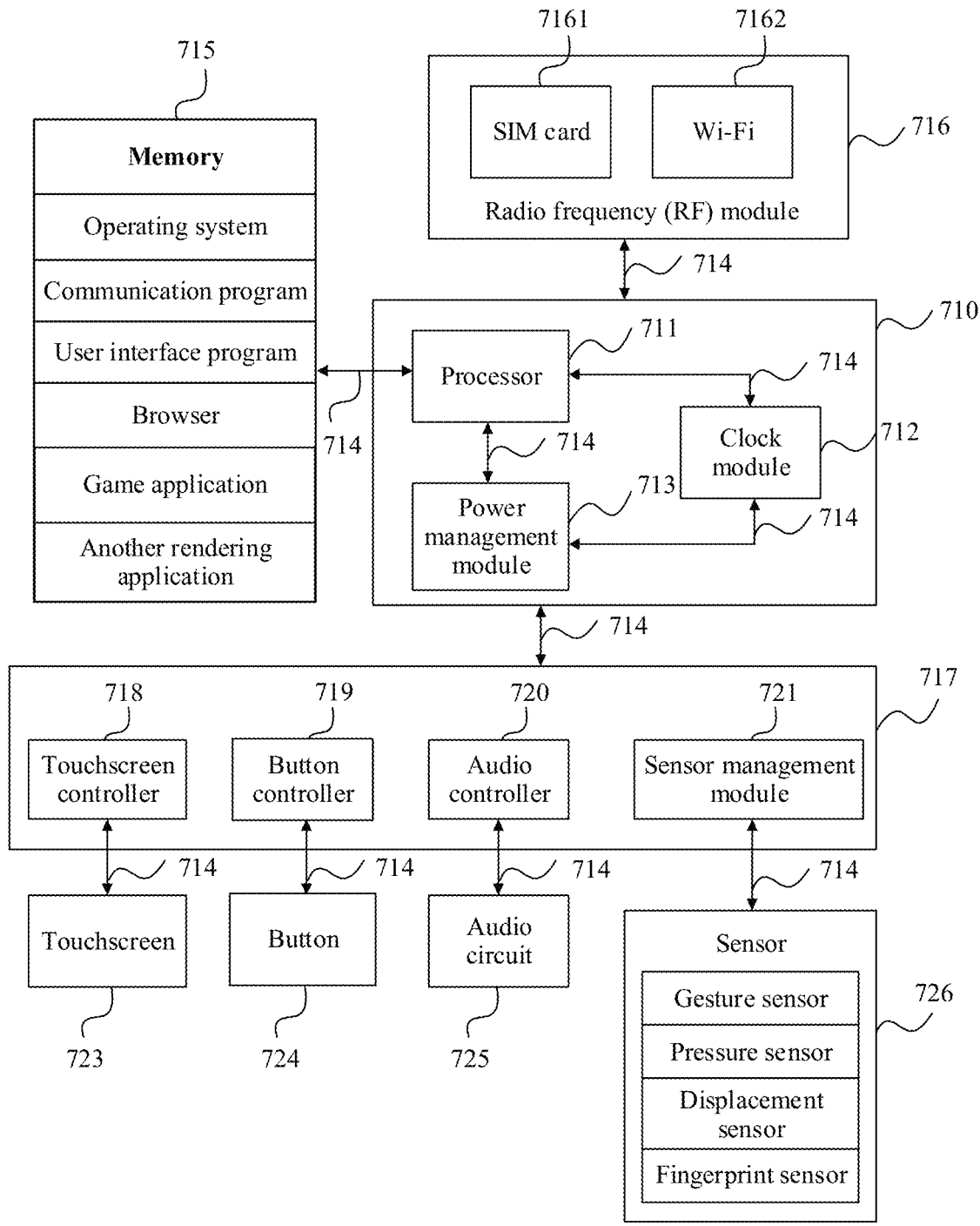
FIG. 8 is a block diagram of a structure of an intelligent terminal according to an implementation.

For example, the terminal device is an intelligent terminal. FIG. 8 is a block diagram of a structure of an intelligent terminal according to an implementation. As shown in FIG. 8, the intelligent terminal may include a baseband chip 710, a memory 715 including one or more computer-readable storage media, a radio frequency (RF) module 716, and a peripheral system 717. These components may perform communication on one or more communication buses 714.

The peripheral system 717 is mainly configured to implement an interaction function between the intelligent terminal and a user or an external environment, and mainly includes an input/output apparatus of the intelligent terminal. During specific implementation, the peripheral system 717 may include a touchscreen controller 718, a button controller 719, an audio controller 720, and a sensor management module 721. The controllers may be coupled to respective corresponding peripheral devices, for example, a touchscreen 723, a button 724, an audio circuit 725, and a sensor 726. In some embodiments, a gesture sensor of the sensor 726 may be configured to receive a gesture control operation input by a user. A pressure sensor of the sensor 726 may be disposed below the touchscreen 723, and may be configured to collect a touch pressure acting on the touchscreen 723 when a user inputs a touch operation by using the touchscreen 723. It should be noted that the peripheral system 717 may further include another I/O peripheral.

The baseband chip 710 may integrate and include one or more processors 711, a clock module 712, and a power management module 713. The clock module 712 integrated in the baseband chip 710 is mainly configured to generate, for the processor 711, a clock required for data transmission and timing control. The power management module 713 integrated in the baseband chip 710 is mainly configured to provide a stable and high-precision voltage for the processor 711, the radio frequency module 716, and the peripheral system.

The radio frequency (RF) module 716 is configured to receive and send a radio frequency signal, and mainly integrates a receiver and a transmitter of the intelligent terminal. The radio frequency (RF) module 716 communicates with a communication network and another communication device by using a radio frequency signal. During specific implementation, the radio frequency (RF) module 716 may include but is not limited to an antenna system, an RF transceiver, one or more amplifiers, a tuner, one or more oscillators, a digital signal processor, a codec chip, a SIM card, a storage medium, and the like. In addition, the radio frequency module 716 may further include a short-range wireless communication module, for example, Wi-Fi or Bluetooth. In some embodiments, the radio frequency (RF) module 716 may be implemented in a separate chip.

The memory 715 may include a random access memory (RAM), a flash memory (Flash Memory), or the like, or may be a RAM, a read-only memory (ROM), a hard disk drive (HDD), or a solid-state drive (SSD). The memory 715 may store an operating system, a communication program, a user interface program, a browser, and a rendering application. The rendering application includes a game application and another rendering application.

Figure 9:
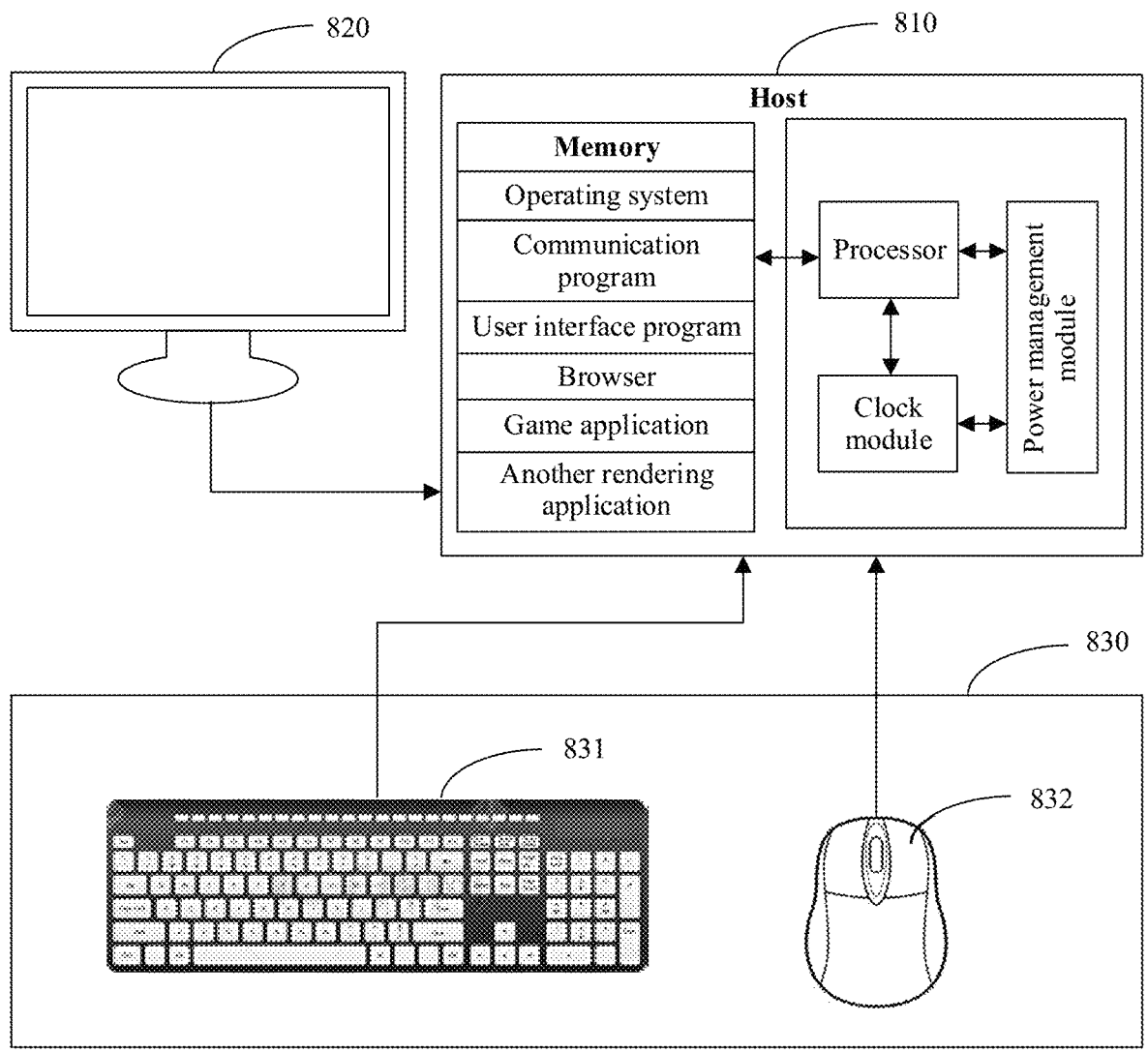
FIG. 9 is a block diagram of a structure of a computer according to an implementation.

For example, the terminal device is a computer. FIG. 9 is a block diagram of a structure of a computer according to an implementation. As shown in FIG. 9, the computer may include a host 810, an output device 820, and an input device 830.

The host 810 may integrate and include one or more processors, a clock module, and a power management module. The clock module integrated in the host 810 is mainly configured to generate, for the processor, a clock required for data transmission and timing control. The power management module integrated in the host 810 is mainly configured to provide a stable and high-precision voltage for the processor, the output device 820, and the input device 830. The host 810 further integrates a memory, configured to store various software programs and/or a plurality of sets of instructions. During specific implementation, the memory may include a high-speed random access memory, and may also include a nonvolatile memory, for example, one or more magnetic disk storage devices, a flash memory device, or another nonvolatile solid-state storage device. The memory may store an operating system, for example, an embedded operating system such as Android, iOS, Windows, or Linux. The memory may further store a communication program. The communication program may be used to communicate with one or more input devices or output devices. The memory may further store a user interface program. The user interface program may vividly display content of a browser by using a graphical operation interface, and receive, by using input controls such as a menu, a dialog box, and a button, a control operation performed by a user on the browser. The memory may further store an operating system, a communication program, a user interface program, a browser, a rendering application, and the like. The rendering application includes a game application and another rendering application.

The output device 820 mainly includes a display, and the display may include a cathode ray tube (CRT) display, a plasma display panel (PDP), a liquid crystal display (LCD), and the like. For example, the display is an LCD. The liquid crystal display includes a liquid crystal panel and a backlight module. The liquid crystal display panel includes a polarizing film, a glass substrate, a black matrix, a color filter, a protective film, a common electrode, a calibration layer, a liquid crystal layer (liquid crystal, a spacer, and a sealant), a capacitor, a display electrode, a prism layer, and an astigmatism layer. The backlight module includes an illumination light source, a reflection plate, a light guide plate, a diffuser, a brightening film (a prismatic lens), a frame, and the like.

The input device 830 may include a keyboard and a mouse. The keyboard and the mouse are the most commonly used and also the most important input devices. English letters, numbers, punctuations, and the like may be input to the computer by using the keyboard, to issue a command, input data, or the like to the computer. Horizontal and vertical coordinate positioning can be quickly performed by using the mouse, to simplify an operation. The keyboard may include a mechanical keyboard, a plastic membrane keyboard (Mechanical), a conductive rubber keyboard (Membrane), a contactless electrostatic capacitive (Capacitive) keyboard, and the like. The mouse may include a trackball mouse, a photoelectric mouse, a wireless mouse, and the like.

Figure 10:
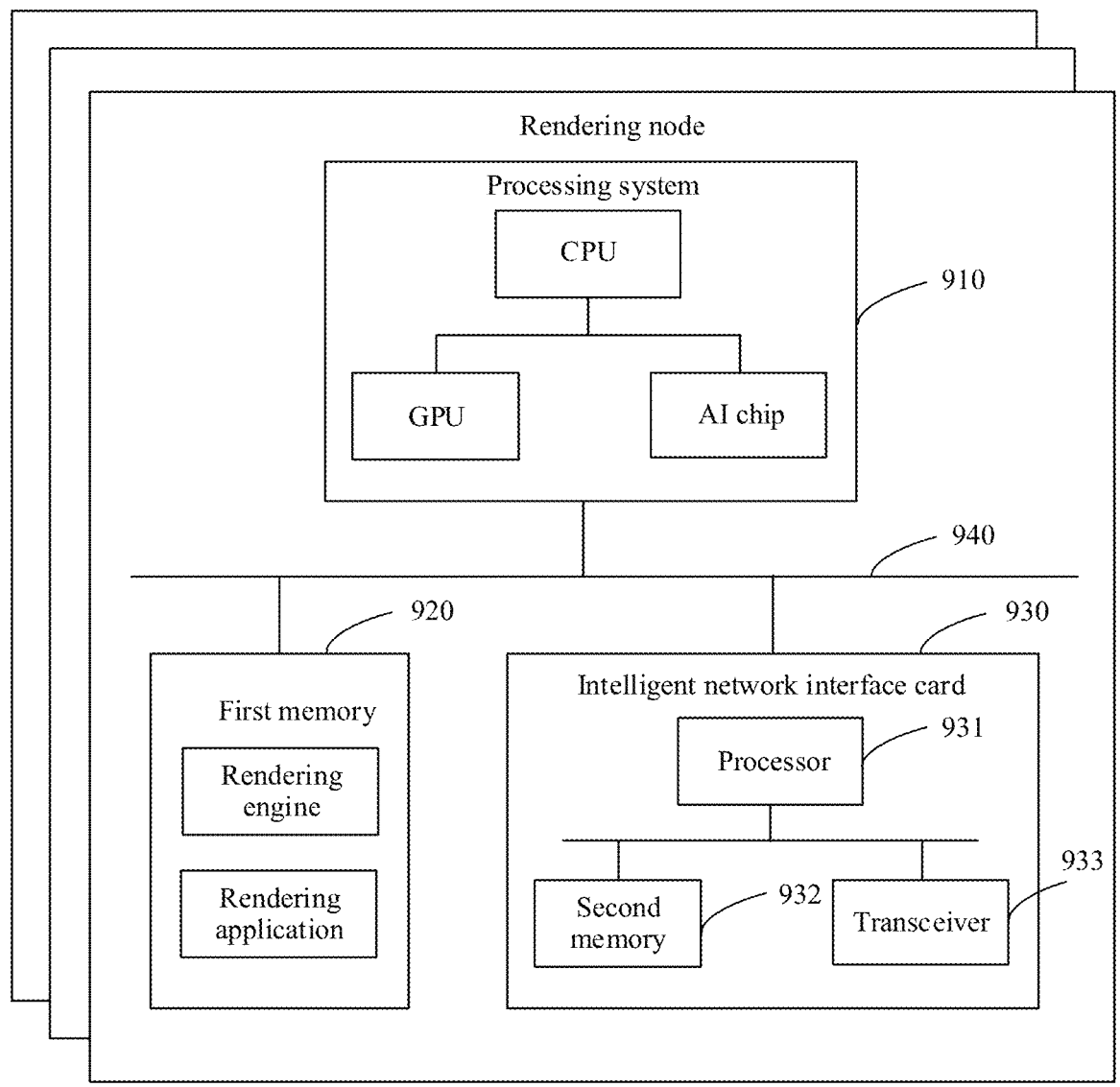
FIG. 10 is a block diagram of a structure of a rendering platform according to an implementation.

FIG. 10 is a block diagram of a structure of a rendering platform according to an implementation. The rendering platform may include one or more cloud rendering nodes. The cloud rendering node includes a processing system 910, a first memory 920, an intelligent network interface card 930, and a bus 940.

The processor system 910 may have a heterogeneous structure, that is, includes one or more general-purpose processors and one or more special processors, for example, a GPU or an AI chip. The general-purpose processor may be any type of device capable of processing electronic instructions, including a central processing unit (CPU), a microprocessor, a microcontroller, a host processor, a controller, an application-specific integrated circuit (ASIC), and the like. The general-purpose processor executes various types of digital storage instructions, such as software or firmware programs stored in the first memory 920. In a specific embodiment, the general-purpose processor may be an x86 processor or the like. The general-purpose processor sends a command to the first memory 920 through a physical interface, to complete a storage-related task. For example, commands that may be provided by the general-purpose processor include a read command, a write command, a copy command, and an erase command. The commands may specify operations related to specific pages and blocks of the first memory 920. The special processor is configured to perform complex operations of image rendering and the like.

The first memory 920 may include a random access memory (RAM), a flash memory (Flash Memory), or the like, or may be a RAM, a read-only memory (ROM), a hard disk drive (HDD), or a solid-state drive (SSD). The first memory 920 stores program code for implementing a rendering engine and a rendering application.

The intelligent network interface card 930 is also referred to as a network interface controller, a network interface card, or a local area network (LAN) adapter. Each intelligent network interface card 930 has a unique MAC address, and is burned into a read-only memory chip by a manufacturer of the intelligent network interface card 930 during manufacturing. The intelligent network interface card 930 includes a processor 931, a second memory 932, and a transceiver 933. The processor 931 is similar to the general-purpose processor, but a performance requirement for the processor 931 may be lower than a performance requirement for the general-purpose processor. In a specific embodiment, the processor 931 may be an ARM processor or the like. The second memory 932 may also be a flash memory, an HDD, or an SSD, and a storage capacity of the second memory 932 may be less than a storage capacity of the first memory 920. The transceiver 933 may be configured to receive and send a packet, and upload a received packet to the processor 931 for processing. The intelligent network interface card 930 may further include a plurality of ports, and the ports may be any one or more of three interface types: a thick cable interface, a thin cable interface, and a twisted pair interface.

For brevity, the cloud rendering system is not described in detail herein. For details, refer to FIG. 1A and FIG. 1B, FIG. 2, FIG. 3A and FIG. 3B, FIG. 4 to FIG. 8, and related descriptions. The rendering platform may perform the method for establishing a grid rendering resource in FIG. 4 and the rendering method in FIG. 5. In addition, the obtaining module 310 in FIG. 6 may be implemented by using the intelligent network interface card 930 in this embodiment, the determining module 320 in FIG. 6 may be implemented by using the processor system 910 in this embodiment, and the storage module in FIG. 6 may be implemented by using the first memory 920 in this embodiment. The obtaining module 410 in FIG. 7 may be implemented by using the intelligent network interface card 930 in this embodiment, the selection module 420 in FIG. 7 may be implemented by using the processor system 910 in this embodiment, and the coloring module in FIG. 7 may be implemented by using the processor system 910 in this embodiment.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, all or some of the procedures or functions according to embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by the computer, or a data storage device, for example, a server or a data center, integrating one or more usable media. The available medium may be a magnetic medium (for example, a floppy disk, a storage disk, or a magnetic tape), an optical medium (a DVD), a semiconductor medium (for example, a solid state storage disk Solid State Disk (SSD)), or the like.

What is claimed is:

1. A rendering method, comprising:
   obtaining, by a rendering platform, an influential variable of a coloring result of a to-be-processed grid, wherein the to-be-processed grid comprises one or more regions of a surface of a three-dimensional model, and wherein the influential variable comprises a scene identifier and a grid identifier;
   selecting, by the rendering platform, a coloring result of a matching sample grid from a grid rendering resource based on the influential variable of the coloring result of the to-be-processed grid, wherein a scene identifier and a grid identifier of the coloring result of the matching sample grid match the scene identifier and the grid identifier of the influential variable, and wherein the grid rendering resource stores influential variables of coloring results of a plurality of sample grids and corresponding coloring results of the plurality of sample grids; and
   returning, by the rendering platform, the coloring result of the matching sample grid as the coloring result of the to-be-processed grid.

2. The method according to claim 1, wherein the influential variable of the coloring result of the to-be-processed grid further comprises at least one of the following: a light source quantity, a light source type, a light source position, a grid normal angle, a grid material, or a grid position.

3. The method according to claim 2, wherein light sources and three-dimensional objects of two scenes with a same scene identifier are the same or have a similarity greater than a second threshold.

4. The method according to claim 1, wherein the influential variable of the coloring result of the to-be-processed grid further comprises at least one of the following: a light source type, a light source position, a grid normal angle, a grid material, or a grid position; and
   the selecting, by the rendering platform, the coloring result of the matching sample grid from the grid rendering resource based on the influential variable of the coloring result of the to-be-processed grid comprises:
   selecting, by the rendering platform from the grid rendering resource, the matching sample grid whose light source type, light source position, grid normal angle, grid material, and grid position have a similarity, greater than a first threshold, to the light source type, the light source position, the grid normal angle, the grid material, and the grid position of the coloring result of the to-be-processed grid.

5. The method according to claim 1, wherein
   when there is one matching sample grid, the rendering platform uses a coloring result of the matching sample grid as the coloring result of the to-be-processed grid; or when there are a plurality of matching sample grids, the rendering platform uses an average value of the matching sample grids as the coloring result of the to-be-processed grid.

6. The method according to claim 1, further comprising:
obtaining an influential variable of a coloring result of a first sample grid, wherein the first sample grid comprises one or more regions of a surface of a three-dimensional model;
determining, by the rendering platform, the coloring result of the first sample grid based on the influential variable of the coloring result of the first sample grid; and
storing, by the rendering platform in a grid rendering resource, the influential variable of the coloring result of the first sample grid and the coloring result of the first sample grid in association.

7. The method according to claim 6, further comprising:
discarding a coloring result of a second sample grid when a scene identifier and a grid identifier of the coloring result of the first sample grid match a scene identifier and a grid identifier of the coloring result of the second sample grid.

8. The method according to claim 7, further comprising:
updating the coloring result of the first sample grid using the coloring result of the first sample grid and a coloring result of the second sample grid, when the scene identifier and the grid identifier of the coloring result of the first sample grid match a scene identifier and a grid identifier of the coloring result of the second sample grid.

9. A method for establishing a grid rendering resource, comprising:
obtaining, by a rendering platform, an influential variable of a coloring result of a first sample grid, wherein the first sample grid comprises one or more regions of a surface of a three-dimensional model, and wherein the influential variable of the coloring result of the first sample grid comprises a scene identifier and a grid identifier;
determining, by the rendering platform, the coloring result of the first sample grid based on the influential variable of the coloring result of the first sample grid; and
storing, by the rendering platform in a grid rendering resource, the influential variable of the coloring result of the first sample grid, comprising the scene identifier and the grid identifier, and the coloring result of the first sample grid in association.

10. The method according to claim 9, wherein the influential variable of the coloring result of the first sample grid further comprises at least one of the following: a light source quantity, a light source type, a light source position, a grid normal angle, a grid material, or a grid position.

11. The method according to claim 9, further comprising:
when the scene identifier and the grid identifier of the coloring result of the first sample grid match a scene identifier and a grid identifier of a coloring result of a second sample grid, discarding the coloring result of the second sample grid, or updating the coloring result of the first sample grid by using the coloring result of the first sample grid and the coloring result of the second sample grid.

12. The method according to claim 11, wherein the influential variable of the coloring result of the first sample grid further comprises a light source quantity, a light source type, a light source position, a grid normal angle, a grid material, and a grid position, the method further comprising:
when the coloring result of the first sample grid and the coloring result of the second sample grid have a similarity greater than a first threshold in their light source quantities, light source types, light source position, grid normal angles, grid materials, and grid positions, discarding the coloring result of the second sample grid, or updating the coloring result of the first sample grid by using an average value of the coloring result of the first sample grid and the coloring result of the second sample grid.

13. The method according to claim 9, wherein
light sources and three-dimensional objects of two scenes with a same scene identifier are the same or have a similarity greater than a second threshold.

14. A rendering node, comprising:
a processor; and
a memory storing a program that, when executed by the processor, cause the processor to:
obtain an influential variable of a coloring result of a to-be-processed grid, wherein the to-be-processed grid comprises one or more regions of a surface of a three-dimensional model, and wherein the influential variable comprises a scene identifier and a grid identifier;
select a coloring result of a matching sample grid from a grid rendering resource based on the influential variable of the coloring result of the to-be-processed grid, wherein a scene identifier and a grid identifier of the coloring result of the matching sample grid match the scene identifier and the grid identifier of the influential variable, and wherein the grid rendering resource stores influential variables of coloring results of a plurality of sample grids and corresponding coloring results of the plurality of sample grids; and
return the coloring result of the matching sample grid as the coloring result of the to-be-processed grid.

15. The rendering node according to claim 14, wherein the processor is further to:
obtain an influential variable of a coloring result of a first sample grid, wherein the first sample grid comprises one or more regions of a surface of a three-dimensional model;
determine, by the rendering node, the coloring result of the first sample grid based on the influential variable of the coloring result of the first sample grid; and
store, by the rendering node in a grid rendering resource, the influential variable of the coloring result of the first sample grid and the coloring result of the first sample grid in association.

16. The rendering node according to claim 15, wherein the processor is further to:
discard a coloring result of a second sample grid, when a scene identifier and a grid identifier of the coloring result of the first sample grid match a scene identifier and a grid identifier of the coloring result of the second sample grid.

17. The rendering node according to claim 16, wherein the processor is further to:
update the coloring result of the first sample grid using the coloring result of the first sample grid and a coloring result of the second sample grid, when the scene identifier and the grid identifier of the coloring result of the first sample grid match a scene identifier and a grid identifier of the coloring result of the second sample grid.

18. The rendering node according to claim 15, wherein the influential variable of the coloring result of the first sample grid further comprises at least one of the following: a light source quantity, a light source type, a light source position, a grid normal angle, a grid material, or a grid position.

19. The rendering node according to claim 15, wherein the influential variable of the coloring result of the first sample grid further comprises a light source quantity, a light source type, a light source position, a grid normal angle, a grid material, and a grid position; and wherein the processor is further to:

when the light source quantity, the light source type, the light source position, the grid normal angle, the grid material, and the grid position of the coloring result of the first sample grid have a similarity, greater than a first threshold, to a light source quantity, a light source type, a light source position, a grid normal angle, a grid material, and a grid position of a coloring result of a second sample grid, discard the coloring result of the second sample grid, or updating the coloring result of the first sample grid by using an average value of the coloring result of the first sample grid and the coloring result of the second sample grid.

20. The rendering node according to claim 14, wherein light sources and three-dimensional objects of two scenes with a same scene identifier are the same or have a similarity greater than a second threshold.

* * * * *